United States Patent [19]
DeRee

[11] 4,019,237

[45] Apr. 26, 1977

[54] TOOL FOR DISASSEMBLING HYDRAULIC VALVE LIFTERS

[76] Inventor: Alvia K. DeRee, Rte. No. 1, Umatilla, Fla. 32784

[22] Filed: Oct. 30, 1975

[21] Appl. No.: 627,076

[52] U.S. Cl. .................................. 29/213 E; 29/259

[51] Int. Cl.$^2$ .......................................... B23P 19/04

[58] Field of Search ......... 29/213, 267, 282, 213 E, 29/214, 244, 259

[56] References Cited

UNITED STATES PATENTS

| | | | |
|---|---|---|---|
| 2,814,098 | 11/1957 | Kessell | 29/267 |
| 2,889,618 | 6/1959 | Morris et al. | 29/267 |
| 2,978,803 | 4/1961 | Davies | 29/282 |
| 3,071,848 | 1/1963 | Lawry et al. | 29/267 |
| 3,270,407 | 9/1966 | Araujo | 29/259 |

*Primary Examiner*—Al Lawrence Smith
*Assistant Examiner*—Roscoe V. Parker
*Attorney, Agent, or Firm*—Duckworth, Hobby, Orman, Allen & Pettis

[57] ABSTRACT

A tool for disassembling hydraulic valve lifters of the type having a housing enclosing a plunger longitudinally movable through a cylindrical cavity therein, the plunger having a coaxial cavity therein with a circumferential lip or groove adjacent the open end thereof. A shaft communicates into the coaxial cavity of the plunger. The shaft has at the distended end thereof an annular head for engaging the circumferential lip adjacent the open end of the plunger. The distended end of the shaft and the annular head also include a longitudinal slot therethrough parallel to the axis of the shaft. An activating device is included adjacent to the longitudinal slot for enlarging the annular head to engage the circumferential lip inside the plunger. The tool also includes a frame for communicating with and restraining the longitudinal movement of the housing. A first cam is movably coupled between the shaft and the frame for longitudinally moving the shaft relative to the frame, whereby the shaft having the plunger coupled thereto by the annular head is extracted from the cavity within the housing by manually rotating the cam.

15 Claims, 3 Drawing Figures

TOOL FOR DISASSEMBLING HYDRAULIC VALVE LIFTERS

BACKGROUND OF THE INVENTION

1. Field of the Invention

This invention relates to an apparatus for disassembling a hydraulic valve lifter used in automobile engines.

2. Description of the Prior Art

Many modern automobile internal combustion engine designs have replaced the mechanical valve lifters with "no-lash" hydraulic valve lifters. The typical hydraulic valve lifter employs a cylindrically shaped body containing a hydraulic fluid and a plunger movable therewithin. The plunger includes on its upper face a cup-like receptacle for the valve stem or push rod, and on its lower face a check valve which allows the oil to move internally between the plunger cavity and a subjacent cavity inside the cylindrical housing, with the motion of the hydraulic fluid absorbing the lost motion or lash in the valve operating mechanism.

Occasionally, the internal plunger becomes jammed within the cylindrical housing due to an accumulation of incomplete combustion products and contaminated lubricating oil. When the plunger becomes jammed the valve operating mechanism becomes noisy and the hydraulic valve lifter must be replaced. Also, when rebuilding older engines it is advisable to disassemble the hydraulic valve lifter assembly to remove any accumulated contaminates therein. In both of these instances when disassembly is thwarted by a stuck plunger it is necessary to discard the old hydraulic valve lifter and insert a new replacement. This replacement is unnecessarily expensive since the old valve lifters can be quickly, easily and inexpensively disassembled, cleaned and inspected if an inexpensive and reliable tool could be utilized in the disassembly thereof.

The C. B. Clarke U.S. Pat. No. 2,754,574 and J. T. Clark U.S. Pat. No. 2,877,542 disclose similar devices for inserting a tool within the valve lifter and forcing a grease or other hydraulic fluid behind the plunger and thereby forcing the plunger outwardly from the cylindrical housing. This method is satisfactory, but requires a source of hydraulic fluid or grease under high pressure and also leaves the hydraulic lifter assembly quite messy after the disassembly project has been completed.

Tutino in U.S. Pat No. 3,681,838 discloses an invention for removing the hydraulic valve lifter from the engine or head block assembly. This invention includes a device which is inserted into the first interface circumferential edge of the cylindrical housng for the hydraulic valve lifter. The device is then expanded therewithin such that grasping lips around the circumferential surface thereof communicate with the first interface circumferential edge of the valve lifter allowing the hydraulic valve lifter assembly to be withdrawn from the engine block or head assembly. However, this invention is described as only being useful for removing the hydraulic valve lifter assembly from the engine and not for disassembling the hydraulic valve lifter assembly for cleaning and repair. Furthermore, this device couples to the hydraulic valve lifter housing and not to the movable plunger therein.

A tangentially related invention is disclosed by Kanda in U.S. Pat. No. 3,823,462 relating to a tool to facilitate the extraction of broken components of a sprinkler system from the interior of conduit pieces.

SUMMARY OF THE INVENTION

A tool for disassembling hydraulic valve lifters of the type having a housing enclosing a plunger longitudinally movable through an internal cylindrical cavity, and the plunger having an internal coaxial cavity with a circumferential lip or groove therein adjacent the open end thereof. The tool includes a shaft for communicating into the coaxial cavity of the plunger. The shaft includes at the distended end thereof means for engaging the circumferential lip adjacent the open end of the plunger. Activating means are coupled to the shaft for activating the engaging means to engage the circumferential lip of the plunger. A frame is included for communicating with and restraining the longitudinal movement of the housing. A first cam means is movably coupled between the shaft and the frame for longitudinally moving the shaft relative to the frame, whereby the shaft having the plunger coupled thereto by the engaging means is extracted from the cavity within the housing by the movement of the first cam means.

THE DRAWINGS

DETAILED DESCRIPTION OF THE PREFERRED EMBODIMENT

Figure 1:
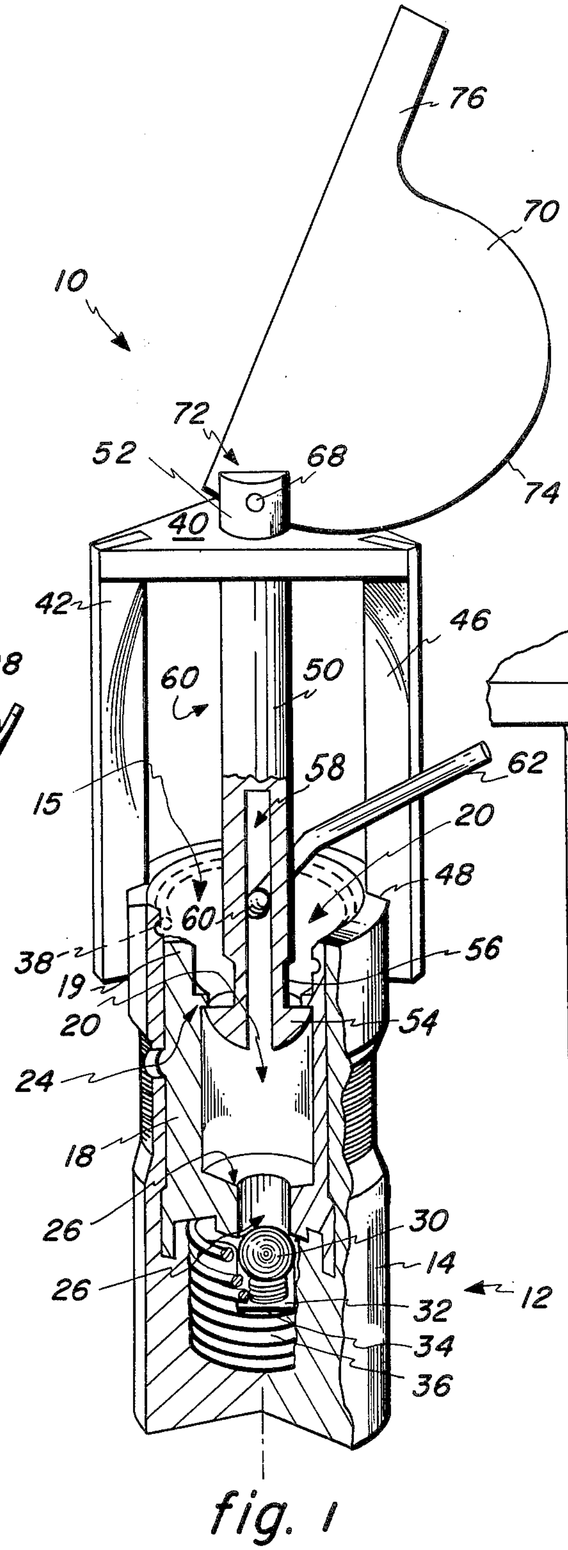
FIG. 1 is a sectioned, perspective view of a first preferred embodiment of the tool for disassembling hydraulic valve lifters.

The preferred embodiment of the tool for disassembling hydraulic valve lifters, designated as 10 in FIG. 1, is shown as being inserted into a hydraulic valve lifter 12. The hydraulic valve lifter 12 includes a hollow cylindrical housing 14 open at one end and having a substantially cylindrical cavity 15 coaxially therein. A plunger 18 is adapted to snugly fit within the cylindrical cavity 15 of the housing 14 and be longitudinally movable therein. An internal chamber is defined by a cylindrical cavity 20 coaxially located within the plunger 18. One end 19 of the plunger 18 is open whereas the other end includes a bore 26 coaxially located along the central axis of the housing 14. A circumferential lip or groove 24 is located within the coaxial cavity 20 of the plunger 18 adjacent the open end 19 thereof. A ball valve 30 is located subjacent to the bore 26 and is retained in communication therewith by a ball valve retaining spring 32 and a retaining cup 34. The retaining cup 34 is biased upwardly by the action of the compression spring 36. The diameter of the ball valve 30 is slightly greater than the diameter of the bore 26 to effectively seal the bore 26 against the flow of hydraulic fluid therethrough, but the seal may be forced open by a downward pressure differential. The internal components of the housing 14 are retained therein by the action of a retaining ring 38 located above the coupling 20.

The tool for disassembling hydraulic valve lifters 10 includes a generally triangular base section 40 having three legs 42, 44 (hidden) and 46 depending perpendicularly therefrom. In the first preferred embodiment, the legs 42, 44 and 46 are movably attached by dovetail joints to the frame 40 so that they may be removed therefrom to facilitate the coupling with the hydraulic lifter 12. The legs 42, 44 and 46 are generally rectangular and include a rectangular shaped notch 48 at the distended end thereof facing inwardly to slidably couple with the cylindrical housing 14 of the hydraulic lifter 12 for preventing the longitudinal movement thereof.

With continuing reference to FIG. 1, a generally cylindrical shaft 50 communicates perpendicularly through an aperture 52 of the frame 40. The shaft 50 includes an annular head 54 coaxially located at the distended end thereof. The shaft 50 also includes a reduced diameter section 56 immediately adjacent to the annular head 54. The distended end of the shaft 50 also includes a first longitudinal rectangular slot 58 which communicates through the shaft 50 along the center axis thereof through both the annular head 54 and the reduced diameter section 56. A rotatable second cam (or second cam means) 60 is coupled within the first longitudinal slot 58 for spreading the juxtaposed sides of the shaft 50, thereby causing the annular head 54 to engage the circumferential lip 24 adjacent the open end 19 of the plunger 18. The second cam 60 is rotated about its axis within the longitudinal slot 58 by an extending handle 62 attached thereto.

The other end of the shaft 50 includes a generally rectangular second longitudinal slot 66 (hidden) located generally along the central axis thereof. The plane of the second longitudinal slot 66 is generally perpendicular to the plane of the first longitudinal slot 58. A second pivot shaft 68 communicates through the end of the shaft 50 perpendicular to the plane of the second longitudinal slot 66. A rotatable cam 70 (first cam or first cam means) has a bore 72 therethrough for rotatably coupling about the second pivot shaft 68. The rotatable cam 70 is adapted to rotate within the second longitudinal slot 66 so that a curvilinear cammed surface 74 will communicate with the upper surface of the frame 40. The rotatable cam 70 includes a handle section 76 spaced on the opposite side from the bore 72. As the handle 76 is rotated downwardly against the upper surface of the frame 40, the shaft 50 is pulled upward.

The operation of the tool for disassembling hydraulic valve lifters will now be described with reference to FIG. 1. First, the retaining ring 38 is removed from the housing 14. Next, the hydraulic valve lifter 12 is moved into close communication with the notches 48 of the legs 42, 44 and 46 attached to the frame 40. When properly oriented, the shaft 50 should be coaxial with the cavity 20 and the bore 26 of the plunger 18. The operator then grasps the cam handle 76 rotating it in a vertically upward direction about the second pivot 68 forcing the shaft 50 downwardly into the hydraulic lifter 12. The annular head 54 will penetrate into the cylindrical cavity 20 of the plunger 18. When the reduced diameter section 56 of the shaft 50 is adjacent to the circumferential lip 24 within the cavity 20 of the plunger 18, the second cam 60 is rotated by means of the handle 62 attached thereto, thereby further separating the juxtaposed sides of the shaft 52 separated by the first longitudinal slot 58. This separating action forces the annular head 54 into close communication with the circumferential lip 24 adjacent to the open end 19 of the plunger 18. Next, the handle 76 of the rotatable cam 70 is rotated downward against the upper surface of the frame 40 thus causing the shaft 50 to be withdrawn from within the housing 14. Additional pressure may be exerted by striking the handle 76 with a small hammer. Since the three legs 42, 44 and 46 restrain the movement of the housing 14 against the movement of the plunger 18, the withdrawal of the shaft 50 having the plunger 18 coupled thereto about the annular head 54 will disengage the internal parts of the hydraulic lifter 12. These internal parts may then be cleaned, inspected and if satisfactory, reassembled much more cheaply than if new hydraulic lifters were inserted therefor.

Figure 2:
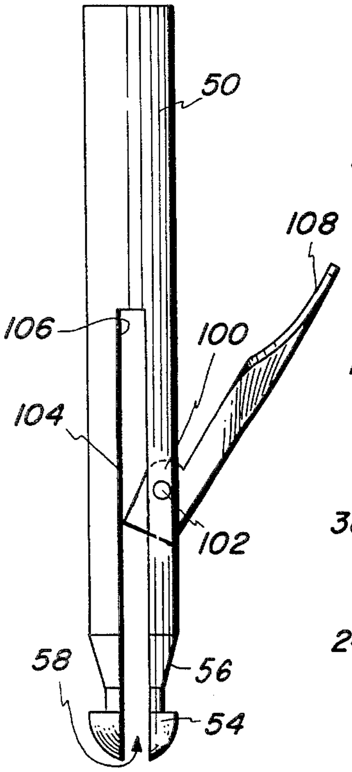
FIG. 2 is a frontal elevation of a second preferred embodiment of the shaft having engaging means at the distended end thereof.

FIG. 2 illustrates a second preferred embodiment of the second cam means. A second cam 100 is movably coupled to one side of the shaft 50 about a third pivot shaft 102. A curvilinear face 104 of the second cam 100 slidably moves along one face 106 of the longitudinal slot 58 within the shaft 50, thereby separating the juxtaposed sides of the longitudinal slot 58 and enlarging the effective diameter of the annular head 54 of the shaft 50. A handle 108 adds mechanical advantage to the rotation of the second cam 100 about the third pivot shaft 102.

Figure 3:
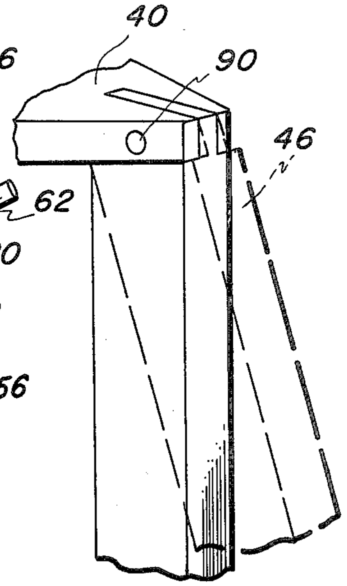
FIG. 3 is a perspective view of an alternate method of rotatably coupling the legs to the frame of the tool for disassembling hydraulic valve lifters.

FIG. 3 illustrates an alternate method for pivotally attaching the legs 42, 44 and 46 to the frame 40. A pivot 90 communicates through a bore within one of the legs and is attached to the frame 40. The pivot 90 is oriented perpendicular to the shaft 50 and generally in the same plane with the frame 40 so that the leg may rotate in a plane parallel to the shaft 50 for coupling with the housing 14 of the valve lifter 12.

It will be clear at this point that a tool for disassembling hydraulic valve lifters has been provided which overcomes some of the problems of prior tools. However, the invention is not to be construed as limited to the particular forms disclosed herein since these embodiments are to be regarded as illustrative rather than restrictive.

I claim:

1. A tool for disassembling hydraulic valve lifters of the type having a housing enclosing a plunger longitudinally movable through a cylindrical cavity therein, the plunger having a coaxial cavity therein with a circumferential lip or groove adjacent the open end thereof, said tool comprising in combination:

a shaft for communicating into said coaxial cavity of said plunger, said shaft having at the distended end thereof engaging means for engaging said circumferential lip adjacent said open end of said plunger;

activating means coupled to said shaft for activating said engaging means to engage said circumferential lip;

a frame for communicating with said housing for restraining the longitudinal movement thereof, said frame comprising a plurality of legs movably depending longitudinally therefrom with each of said legs being rotatable about a first pivot generally perpendicular to said shaft for movably engaging or disengaging said housing; and first means movably coupled between said shaft and said frame for longitudinally moving said shaft relative to said frame, whereby said shaft having said plunger coupled thereto by said engaging means is extracted from said cavity within said housing by the movement of said first means.

2. A tool as described in claim 1 wherein said engaging means comprises an annular head at said distended end of said shaft for engaging said circumferential lip of said plunger, said distended end of said shaft and said annular head having a first longitudinal slot centered therethrough and parallel to the axis of said shaft.

3. A tool as described in claim 2 wherein said activating means includes second cam means for separating the juxtaposed sides of said first longitudinal slot, thereby enlarging the effective diameter of said annular head for engaging said circumferential lip adjacent said open end of said plunger.

4. A tool as described in claim 3 wherein said second cam means rotatably communicates within said first longitudinal slot for separating the juxtaposed sides thereof.

5. A tool as described in claim 3 wherein said second cam means is pivotally coupled to said shaft adjacent said first longitudinal slot for rotatably camming against one of said juxtaposed sides of said longitudinal slot for enlarging the effective diameter of said annular head.

6. A tool as described in claim 2 wherein said distended end of said shaft includes a reduced diameter section adjacent to said annular head for increasing the effective communication between said annular head and said circumferential lip of said piston.

7. A tool as described in claim 2 wherein said frame includes a plurality of legs depending longitudinally therefrom, said legs having at the distended end thereof recessed notches for engaging and restraining said housing therein.

8. A tool as described in claim 1 wherein said first means comprises:

a first cam movably coupled to said shaft about a second pivot perpendicular thereto, said first cam having a curvilinear surface thereon for communicating across said frame as said first cam is rotated about said second pivot;

lever means coupled to said first cam perpendicular to said second pivot for adding mechanical advantage to a force exerted thereon for rotating said first cam.

9. A tool as described in claim 8 wherein said shaft includes a second longitudinal slot centered therein and adjacent to said second pivot shaft, the plane of said second longitudinal slot being parallel to the plane of said first cam for allowing said first cam to pass therethrough as said first cam is rotated about said second pivot.

10. A tool as described in claim 9 wherein said plane of said second longitudinal slot is perpendicular to a plane of said first longitudinal slot.

11. A tool for disassembling hydraulic valve lifters of the type having a housing enclosing a plunger longitudinally movable through a cylindrical cavity therein, the plunger having a coaxial cavity therein with a circumferential lip adjacent an open end thereof, said tool comprising in combination:

a shaft for communicating longitudinally into said coaxial cavity of said plunger, said shaft having at a distended end thereof engaging means for engaging said circumferential lip adjacent said open end of said plunger;

activating means coupled to said shaft for activating said engaging means to engage said circumferential lip;

a frame having a plurality of legs extending longitudinally therefrom communicating with said housing for restraining the longitudinal movement thereof, and wherein each of said legs is movably coupled to said frame about a first end thereof for allowing a distended end thereof to be moved away from said shaft for providing increased visibility of and access to said coaxial cavity within said plunger, with each of said legs including at said distended end thereof a notch therein for coupling with an outside circumferential surface of said housing for restraining a motion thereof in a direction perpendicular to said longitudinal direction; and first cam means movably coupled between said shaft and said frame for longitudinally moving said shaft relative to said frame, whereby said shaft having said plunger coupled thereto by said engaging means is extracted from said cavity within said housing by the movement of said first cam means.

12. The tool as described in claim 11 wherein each of said legs is movably coupled to said frame within a slot radially extending from said shaft, whereby each of said legs may be moved and spaced radially from said shaft.

13. The tool as described in claim 12 wherein each of said legs includes a dove-tailed wedge thereon for being movably restrained within a dove-tailed slot within said frame extending radially from said shaft.

14. The tool as described in claim 13 wherein said engaging means comprises a bifurcated annular head formed on a distended end of said shaft; and wherein said activating means is coupled within a slot defined between said bifurcated annular head sections of said shaft for increasing the separation therebetween, whereby said annular head section of said shaft may be expanded to couple with said circumferential lip of said plunger.

15. The tool as described in claim 12 wherein said first cam means comprises:

a first cam movably coupled to said shaft about a pivot generally perpendicular thereto, said first cam having a curvilinear surface thereon for communicating across said frame as said first cam is rotated about said pivot; and lever means coupled to said first cam perpendicular to said pivot for adding mechanical advantage to a force exerted thereon for rotating said first cam.

* * * * *